Sept. 9, 1930. H. R. McLEOD ET AL 1,775,316
HARROW
Filed Nov. 15, 1928
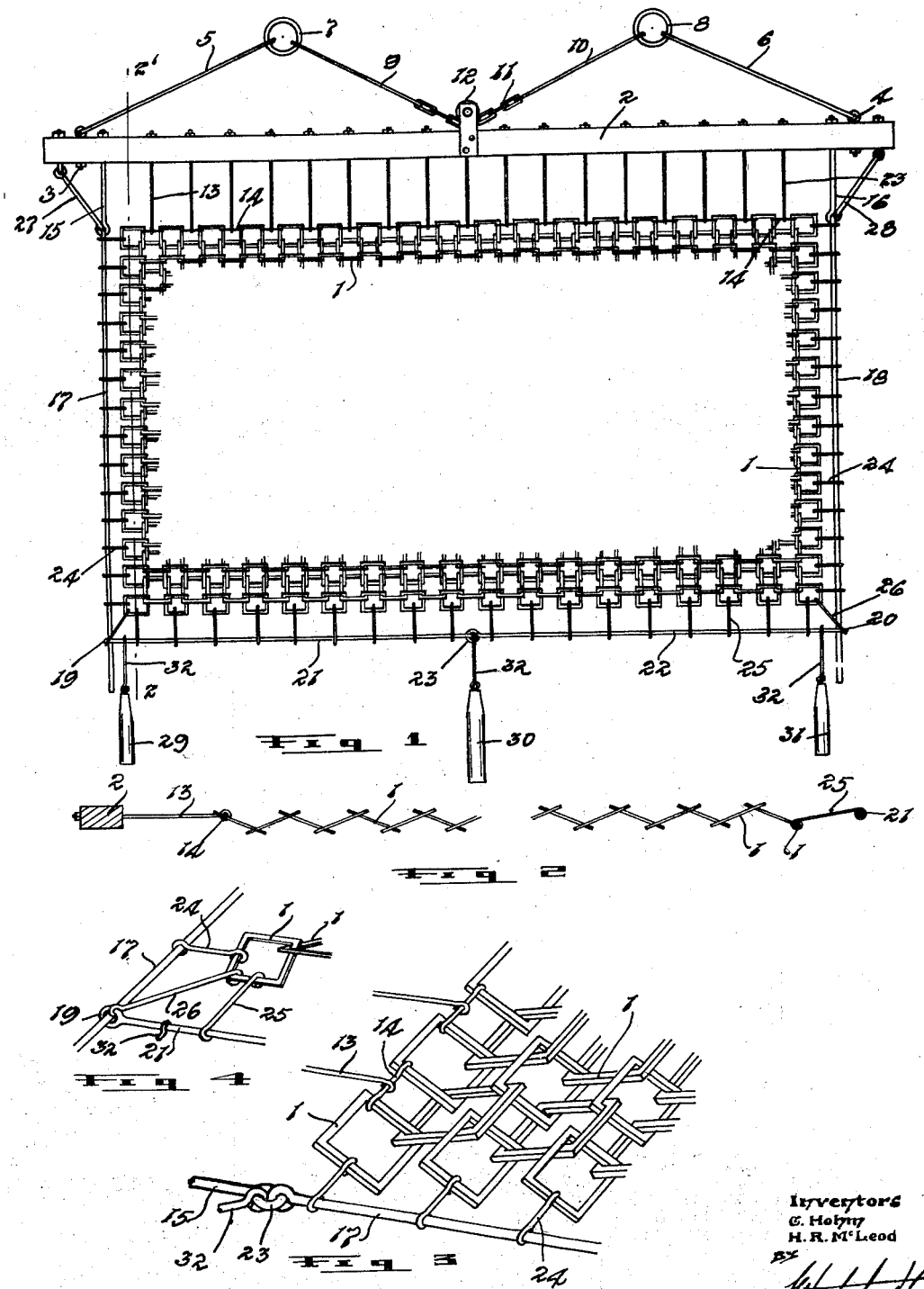
Inventors
C. Holm
H. R. McLeod Patented Sept. 9, 1930

1,775,316

UNITED STATES PATENT OFFICE

HENRY R. McLEOD AND CARL HOHM, OF LESLIEVILLE, ALBERTA, CANADA

HARROW

Application filed November 15, 1928. Serial No. 319,617.

The invention relates to improvements in harrows and an object of the invention is to provide a harrow which will effectively cultivate the soil leaving the land in a fine mulch for a seed bed.

A further object is to construct a harrow which will crush lumps of earth and which will roll up quack grass and other such roots and leave the same lying on the ground surface free from dirt.

A still further object is to construct the harrow so that it is sufficiently flexible to accommodate the ground surface and yet so that the harrow links are held sufficiently rigid in position to do the work for which they are designed.

With the above more important objects in view, the invention consists essentially in the arrangement and construction of parts hereinafter more particularly described, reference being had to the accompanying drawing, in which:—

Fig. 1 is a plan view of the harrow, the central harrowing links having been omitted such being duplicates of those shown.

Fig. 2 is a vertical sectional view at 2—2' Figure 1.

Fig. 3 is a perspective view showing a number of the harrow links.

Fig. 4 is a perspective view of one of the rear corners of the harrow.

In the drawing like characters of reference indicate corresponding parts in the several figures.

The body of the harrow is formed from a predetermined number of harrow links interlinked one with the other to form a flexible mat like structure. Each harrow link 1 is square and is formed from steel and in this connection we might say that we have found that a 4" x 4" square link having a $\frac{7}{16}$" square cross section is desirable. The links are positioned in longitudinally and transversely extending rows, as shown each alternate row being staggered in relation to the adjacent row. As shown we have utilized an even number of links in the side and end rows and we find that a harrow or float 12' long and 6' 6" wide forms a very serviceable and practical implement. Each interior harrow link is connected at the four corners with the adjacent corners of the adjacent four links and the connected links take a canted position as best shown in Figures 2 and 3, there being a series of longitudinal rows of links canted in one direction and a further series of longitudinal rows of links canted in the opposite direction and alternated with the former series.

The draw beam 2 is of the usual type and the draft animals are hitched to it in any well known manner. We have herein shown the ends of the draw bar as provided with eye bolts 3 and 4, and the eye bolts fitted with draft rods 5 and 6 fastened to hitching rings 7 and 8. Further draft rods 9 and 10 are connected to the hitching rings and the inner ends of the draft rods are connected by a chain 11 operated over a centrally located pulley 12 carried by the draw beam. The draft animals are hitched to the rings 7 and 8.

Similar pulling rods 13 are fastened at selected intervals to the draw beam and pass rearwardly towards the harrow links and have their rear ends hooked over tie rods 14 extending between and fastening the several harrow links of the front row of links together. End eye-bolts 15 and 16 are also secured to the ends of the draw beam and have their rear ends connected to eyes formed at the forward ends of similar relatively heavy end rods 17 and 18, the rear ends of which terminate rearwardly of the rear row of harrow links.

The rearwardly extending ends of the end rods are passed through eyes 19 and 20 formed at the outer ends of similar cross rods 21 and 22 which have their inner ends connected together by engaging eyes indicated at 23. The end rods 17 and 18 are connected to the adjacent end rows of harrow links by tie rods 24, and the rear row of harrow links is connected to the cross rods 21 and 22 by tie rods 25. Angularly disposed corner tie rods 26 connect the rear corner harrow links with the eyes 19 and 20 of the cross rods.

From the above it will be apparent that the mat like body of the harrow as formed by the interlinked harrow links is held continuously in an extended position by the tie rods and the pulling rods which connect with the end rods, the cross rods and the draw beam, such latter parts forming virtually a substantially rectangular outer frame for the mat.

Angularly disposed brace rods 27 and 28 extend between the forward ends of the end rods 17 and 18 and the ends of the draw beam.

In order to prevent the rear end of the harrow from attempting to roll up when operating on rough ground or when relatively large clumps of weeds are gathered, we have attached weights to the rear end of the harrow which are indicated at 29, 30 and 31. The weights are of the shape shown, the centre weight being somewhat heavier than the corner weights and they are connected to the rear cross rods 21 and 22 by trailing rods 32 fitted at their forward and rear ends with eyes.

When this device is pulled over the ground, the mat is held extended so that the harrow links can effectively operate on the ground surface and cultivate it leaving it in a fine mulch for a seed bed. The harrow links crush the ground lumps and also operate to roll up quack grass, roots and other such and free the same from dirt and leave them on the ground surface. The harrow is sufficiently flexible to permit it to accommodate the ground surface and while we have mentioned a particular size of harrow, we, of course, do not desire to be limited in this regard, as the harrow can be made of any size without departing from the spirit of the invention.

What we claim as our invention is:—

1. A harrow comprising a draw beam, a mat like body to the rear of the draw beam and formed from a plurality of similar interlinked substantially square harrow links appearing in longitudinally and transversely extending rows, draw rods connecting the front row of links to the draw beam, end rods attached pivotally to the ends of the draw beam and extending rearwardly to the outer sides of the end rows of harrow links, tie rods connecting the end rods to the latter rows of harrow links, jointed cross rods located rearward of the rearmost longitudinal row of harrow links and having the terminal ends thereof attached to the end rods and tie rods connecting the cross rods to the rearmost longitudinal row of harrow links.

2. A harrow comprising a draw beam, a mat like body to the rear of the draw beam and formed from a plurality of similar interlinked substantially square harrow links appearing in longitudinally and transversely extending rows, draw rods connecting the front row of links to the draw beam, end rods attached pivotally to the ends of the draw beam and extending rearwardly to the outer sides of the end rows of harrow links, tie rods connecting the end rods to the latter row of harrow links, jointed cross rods located rearward of the rearmost longitudinal row of harrow links and having the terminal ends thereof attached to the end rods, tie rods connecting the cross rods to the rearmost longitudinal row of harrow links, trailing rods fastened to the jointed cross rods and weights secured to the rear ends of the trailing rods.

Signed at Leslieville, Alberta, Canada, this 20th day of August, 1928.

HENRY R. McLEOD.
CARL HOHM.